Patented Aug. 6, 1946

2,405,336

UNITED STATES PATENT OFFICE 2,405,336

POLYCHLOROPRENE COMPOSITION

Gerald von Stroh, Berkeley, Calif., assignor to The Permanente Metals Corporation, Oakland, Calif., a corporation of Delaware No Drawing. Application March 20, 1944, Serial No. 527,347

3 Claims. (Cl. 260—41)

This invention relates to a process for making rubber and to a product therefor.

In the preparation of manufactured rubber, or it may be said, of manufactured rubber goods, for example, tires, footwear or mechanical goods such as insulation, gaskets or the like, it is necessary to modify the properties of the starting material, which may be rubber or synthetic elastomer, or to impart new properties thereto. In the production of rubbers having the most desirable characteristics for certain uses, it has long been the practice to add certain types of carbons, zinc oxides, magnesium oxides, organic accelerators and the like in the compounding of the rubber. The best methods for adding these various ingredients and the proper types of ingredients for addition to various rubbers have been the subject of considerable investigation. As one instance, a great deal of attention has been given to the proper magnesia addition and numerous products and methods have been devised in order to get the desired degree of dispersion of magnesia in rubbers and to get the maximum beneficial effects from the magnesia added. For example it has been the experience in the neoprene field that it is necessary to add, in compounding, a magnesia which has a high specific surface. The disadvantage has also been encountered, however, that the greater the degree of subdivision of the magnesia, the quicker it will hydrate and this undesirable feature has led to difficulties in handling.

It is one of the objects of this invention to provide an addition product for rubbers which comprises a highly dispersible mixture of carbon and magnesium oxide; and it is another object of this invention to provide an addition product for rubbers which is a finely divided, intimate mixture of magnesium oxide and carbon, as well as to provide a process for treating rubbers which includes the addition of such products therein.

I have discovered that the properties of the rubber starting materials are favorably affected by compounding the starting material with a magnesia and carbon containing product which is obtained by the reaction of magnesium with a carbon oxide to give MgO and carbon or as a residue from the distillation of the crude magnesium condensate produced in the carbothermic process for making magnesium as will be described more fully below. My process of compounding by the addition of the aforesaid magnesia and carbon containing product is especially advantageous in the working-up of synthetic elastomers, and, of the latter, exhibits peculiar advantages in the case of neoprene. In this specification and the appended claims, the term "neoprene" is intended to mean "polymerized chloroprene synthetic rubber."

The product which I have found to be effective in the compounding of rubbers is a magnesia and carbon containing product obtained by reacting magnesium with an oxide of carbon in the vapor state. This proceeds under conditions which produce rapid formation and deposition of solid products of reaction, whereby extremely small particles of MgO are formed. These particles have a carbon surface deposition thereon, the carbon being bonded to the MgO, or are at least co-deposited with carbon which is also in a very high state of subdivision. In making this product, magnesium in the vapor state is reacted with an oxide of carbon such as carbon monoxide or carbon dioxide. For example, magnesium can be vaporized and, while in the vapor state, treated with a stream of carbon monoxide or carbon dioxide to yield the desired product. In the case of carbon monoxide, the raction may be expressed as follows:

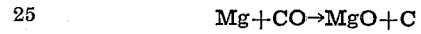

and in the case of carbon dioxide, the reaction may proceed stepwise, first reducing the dioxide to the monoxide and then to carbon or it may proceed more directly, but the final product will contain magnesia and carbon as described.

A magnesia and carbon containing product which is effective in my process can also be obtained, for example, as a result of the manufacture of magnesium by the so-called carbothermic process. In the carbothermic process, magnesium oxide or other suitable magnesium compound and a carbonaceous reducing agent such as coke are reacted in an electric furnace at a suitably high temperature, preferably around 2000° C., to yield magnesium and CO, according to the following equation:

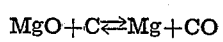

This process has been described by Hansgirg in U. S. 1,884,993 and 1,943,601, and by others. As indicated, this reaction is reversible. It is displaced toward the right by high temperatures and thus is forwarded by the indicated high temperature of reaction. As the vaporous products of reaction pass out of the reaction zone they are chilled as rapidly as possible in a stream of an inert quench gas to condense the Mg as a solid and to reduce the tendency of the reaction to reverse towards the left, or to back-react. Even with such precautions, some of the Mg is back-reacted with the CO to give MgO and carbon.

Thus, the crude condensate from this reaction contains metallic magnesium, MgO, carbon, and small amounts of other compounds such as carbides and nitrides, the latter arising from reaction of the magnesium, for instance, with the nitrogen used in cooling the glands at the site of exit from the furnace, or reaction zone, or from traces of nitrogen present in the quenching gas. The condensate also contains whatever concomitant materials in the furnace feed are carried over in the reaction, such as unreacted MgO and C, CaO and the like. This crude condensate now goes to a distillation zone where the Mg is vaporized off and the other materials are left behind as a product containing magnesia (MgO), carbon and small amounts of other substances as described above. For convenience, I refer to this rubber-compounding material as "carbothermic magnesia."

It is a characteristic of the product obtained by the back-reaction of Mg and CO that the particle size thereof is extremely small, and it furthermore appears that the particles consist of an MgO nucleus upon which a carbon surface deposition is rather firmly bonded. Microscopic investigation has shown that the predominant particle size is below one micron in diameter in the back-reacted material. However, since larger particles of unreacted MgO and C, as well as other substances in larger particles, are also found in the crude condensate and therefore in the distillation residue, it is usually found to be advantageous to grind the distillation residue and air classify the ground material so that it preferably passes thru a 325 mesh screen. This sizing, of course, relates only to the largest particles of any type found in the distillation residue. The characteristics of the particles formed by the back-reaction are not changed or lost by the operations, such as pelleting or impasting, incidental to the distillation of the magnesium from the crude condensate. The grinding and air classification are effective in breaking up grit, or accompanying materials as described above, and in breaking down the extraneous bonding effect which had been produced in the pelleting or impasting, thereby restoring the discrete particles to their original state. The product is black in color.

The product formed in the carbothermic magnesium process is particularly advantageous in compounding rubber in that there are certain other substances present which have specific effects also in the working-up of the rubber. For instance, magnesium nitride is believed to yield ammonia in situ in the compounding operation and it has been observed that this leads to a quicker and tighter cure, which is desirable in some cases, for example in curing thick slabs of elastomer.

It is believed that the compounding of elastomers with carbothermic magnesia, or with the magnesia and carbon product obtained by reacting magnesium and a carbon oxide in the manner set forth above, owes its advantages in some measure to the extremely small particle size of the magnesia, not obtainable by the usual methods of milling, grinding or the like. The magnesia product of my invention tends to be less hygroscopic, and is more effective than other known magnesia products when compared by weight in the compounding of elastomers. Some of its advantages in certain cases may also accrue from the presence of the products of side-reactions, all acting to give results not heretofore attained in the compounding of elastomers with magnesia. Furthermore, it is believed that the carbon present is important in promoting dispersion and in reducing the tendency to hydrate. Other evaluations of its advantages will appear below.

Having described the product of my invention and methods for its production, I shall now give an example of compounding of elastomers by the addition of this product.

In making a neoprene product I admix with 100 lbs. of neoprene, 34 lbs. of semi-reinforcing carbon black, 0.25 lb. resinous tackifier, 1 lb. of stearic acid, 2 lbs. of phenyl-betanaphthylamine (as anti-oxidant), 5 lbs. of zinc oxide, 5 lbs. of mineral oil and 10 lbs. of carbothermic magnesia prepared as described above to substantially pass 325 mesh, and work up in a set of compounding rolls. The compounded neoprene is now allowed to cure and samples are removed for testing, after curing in the known manner at 287° F., at intervals of 10, 20, 40, 60 and 80 minutes. Their properties are compared with those of a neoprene treated exactly in the same manner except that in the compounding formula, 40 lbs. of semi-reinforcing carbon black and 4 lbs. of commercial neoprene grade, or extra light, magnesia are substituted for the corresponding materials and amounts in the carbothermic magnesia formula. The carbothermic magnesia added above has an analysis of about 40% magnesium oxide and 40% carbon, the rest being ash and volatile matter with less than 0.5% metallic magnesium. The table below shows the amount of tension applied at the breaking point for each type of cure, at the indicated duration of cure:

*Table I*

| Time of cure in minutes | Aver. tensile strength in lbs./sq. in. at break— | |
| --- | --- | --- |
| | Carbothermic magnesia | Extra light magnesia |
| 10 | 1,750 | 1,710 |
| 20 | 1,910 | 1,750 |
| 40 | 1,980 | 1,810 |
| 60 | 2,000 | 1,920 |
| 80 | 2,060 | 1,980 |

Table I shows not only that the carbothermic magnesia imparts a higher tensile strength, on an average, than the usual neoprene grade of magnesia, but demonstrates quite clearly by the earlier increase in tensile strength that the rate of cure is accelerated when the relative amounts of magnesia shown are used in compounding. This is advantageous in making a rubber for extrusion or the like, since, as a result of faster curing, a high modulus is reached in a lesser time.

Another advantageous feature of rubbers compounded with carbothermic magnesia is the trend toward giving a much lower average set-at-break. Rubber after stretching does not return to its original length when released and set-at-break measures the permanent elongation, as percentage of the original length of a marked section, which is developed by the tension required to break the piece. The action of carbothermic magnesia in contrast to that of an extra light magnesia with relation to this characteristic in neoprene is shown in Table II, the tests having also been made on samples of the batches described above.

Table II

| Time of cure, minutes | Percentage permanent set | |
|---|---|---|
| | Carbothermic magnesia | Extra light magnesia |
| 10 | 20 | 32 |
| 20 | 20 | 24 |
| 40 | 16 | 23 |
| 60 | 13 | 19 |
| 80 | 12 | 19 |

This table shows the lower average set-at-break which can be expected when carbothermic magnesia is used in compounding rubbers.

It has also been demonstrated by the flexometer tests that the carbothermic magnesia produces a cooler running stock in contrast to the neoprene grade magnesia, in other words, that the temperatures developed in the stock during flexing average about 12% lower in the case of the neoprene formulation using carbothermic magnesia than in the standard neoprene formulation. The rebound, or the resiliency, characteristics are also improved by the carbothermic magnesia in normal, or fresh-cured rubbers, and the results are particularly favorable after aging of the rubber. Other characteristics of neoprene are also favorably affected by the carbothermic magnesia in a specific manner.

The magnesia-containing product which has been described is useful in processes for compounding any natural or synthetic rubber where magnesia is ordinarily employed, and it exhibits specific variations in the results of such processing, some advantages of which have been set forth above. The analysis of the magnesia product may vary but it will contain finely divided MgO particles having an adherent coating of carbon, resulting from the reaction of Mg and CO to obtain solid products of reaction. The proportion of magnesium oxide to carbon will vary with the conditions of reaction and of quenching of the reaction products. Where a hydrocarbon quenching gas is used, as in the carbothermic process, there will undoubtedly be some cracking of the gas with consequent deposition of additional carbon. The total amount of carbon and constituents other than magnesium oxide in the product is substituted for an equal amount of the semi-reinforcing carbon black which is usually added in the compounding formulation. The product comprises a finely divided magnesium oxide in association with carbon, produced as described above, and, in carbothermic magnesia, the proportion of magnesium oxide may usually vary from 20% to 70% of the whole, the rest being predominantly carbon with other constituents as indicated above. The amount of metallic Mg present may vary considerably. If desired, the carbothermic magnesia, or the magnesia and carbon containing product made in any other way, can be freed of the other constituents arising in the reaction by purification by distillation as shown above, or it may be treated in any other desired manner to yield a product containing substantially no substances other than carbon and magnesia.

Other carbon and magnesia containing products which can be advantageously used in compounding rubbers are made by intergrinding carbon and magnesia to give a product which is in intimate admixture and of very small particle size, or by very finely subdividing a product obtained by co-coking finely divided MgO and a liquefiable carbonaceous material.

Having now described my invention, what I wish to claim is:

1. Polymerized chloroprene synthetic rubber having uniformly dispersed therein a magnesia and carbon containing product obtained by reacting magnesium and an oxide of carbon in the vapor phase.

2. Polymerized chloroprene synthetic rubber having uniformly dispersed therein a magnesia and carbon containing product obtained as a residue from the distillation of crude magnesium condensate produced in the carbothermic process for making magnesium.

3. Polymerized chloroprene synthetic rubber having uniformly dispersed therein a magnesia and carbon containing product obtained as a residue from the distillation of crude magnesium condensate produced in the carbothermic process for making magnesium, said residue being ground and air-classified to substantially pass a 325-mesh screen.

GERALD von STROH.